United States Patent [19]

Morishita et al.

[11] Patent Number: 4,668,871
[45] Date of Patent: May 26, 1987

[54] AUXILIARY DEVICE DRIVING STARTER MOTOR

[75] Inventors: Mitsuharu Morishita; Kiyoshi Yabunaka, both of Himeji, Japan

[73] Assignee: Mitsubishi Denki Kabushiki Kaisha, Tokyo, Japan

[21] Appl. No.: 664,388

[22] Filed: Oct. 24, 1984

[30] Foreign Application Priority Data

Oct. 27, 1983 [JP] Japan ................. 58-203076

[51] Int. Cl.$^4$ ............................... H02K 7/10
[52] U.S. Cl. ................. 290/36 R; 310/219; 318/4
[58] Field of Search ............. 290/36 R, 38 R, 38 A, 290/38 C, 38 E, 48; 318/4; 310/198, 219; 123/179 R, 179 A

[56] References Cited

U.S. PATENT DOCUMENTS

| | | | |
|---|---|---|---|
| 2,403,099 | 7/1946 | Lear | 318/4 X |
| 3,177,368 | 4/1965 | Selly | 290/38 |
| 3,463,995 | 8/1969 | Herold | 320/6 |
| 3,584,229 | 6/1971 | West | 290/38 |
| 4,241,271 | 12/1980 | Johnson et al. | 310/219 |
| 4,517,466 | 5/1985 | Ogawa | 290/36 R |
| 4,559,455 | 12/1985 | Tanaka | 318/4 X |

FOREIGN PATENT DOCUMENTS

| | | |
|---|---|---|
| 0109216 | 10/1983 | European Pat. Off. . |
| 3121058 | 2/1964 | Fed. Rep. of Germany . |
| 1601606 | 5/1977 | United Kingdom . |
| 2041677 | 9/1979 | United Kingdom . |
| 2081992 | 8/1980 | United Kingdom . |

*Primary Examiner*—William M. Shoop, Jr.
*Assistant Examiner*—W. E. Duncanson, Jr.
*Attorney, Agent, or Firm*—Oblon, Fisher, Spivak, McClelland & Maier

[57] ABSTRACT

In an auxiliary device driving motor, at least one of spring pressure to brushes and material of the brushes in contact with a commutator of said d.c. motor, an armature winding and a field winding is changed to obtain output characteristic in which current at non-load revolution is reduced and the engine is started within a high output region of the output characteristic while the auxiliary rotating machine is driven within a low power region.

5 Claims, 2 Drawing Figures

AUXILIARY DEVICE DRIVING STARTER MOTOR

BACKGROUND OF THE INVENTION

The present invention relates to an auxiliary device driving starter motor. More particularly, it relates to an auxiliary device driving starter motor (a multifunction starter) for driving auxiliary devices by a starter motor.

As a starter motor mounted on an automobile to start the engine, there has been generally used a series winding type d.c. motor having a large output of 1 to several K Watts. Since such d.c. motor is used for starting the engine, it is sufficient to operate it only for a short time (normally, at most 30 seconds). However, significant current at non-load revolution (50 amperes to 100 amperes), as described below, is a characteristic of the operation of the d.c. motor. Accordingly, in a multifunction starter as a driving source used for other than starting of an engine, namely an auxiliary device driving starter motor, there are disadvantages that energy loss in the device is large and durability in the device is inferior.

SUMMARY OF THE INVENTION

The present invention aims at providing a construction such that current flowing at the time of non-load revolution of a d.c. motor is reduced to a substantial extent and an engine is started at a high power output region, while an auxiliary rotating machine is driven at a low power output region of the output characteristic of the d.c. motor, in view of the disadvantage of the conventional starter motor.

The present invention provides an auxiliary device driving starter motor comprising a d.c. motor for starting an engine, the d.c. motor being adapted to start the engine by connecting its rotational force to the engine and to drive an auxiliary rotating machine without connecting the rotational force to the engine, characterized in that at least one of the spring pressure to brushes and material of the brushes in contact with a commutator of the d.c. motor, an armature winding and a field winding is changed to obtain an output characteristic in which current at non-load revolution is reduced and the engine is started within a high output region of the output characteristic while the auxiliary rotating machine is driven within a low power region.

BRIEF DESCRIPTION OF THE DRAWINGS

A more complete appreciation of the invention and many of the attendant advantage thereof will be readily obtained as the same becomes better understood by reference to the following detailed description when considered is connection with the accompanying drawing, wherein.

DETAILED DESCRIPTION OF THE PREFERRED EMBODIMENT

An embodiment of the auxiliary device driving starter motor of the present invention will be described in detail with reference to FIGS. 1 and 2.

Figure 1:
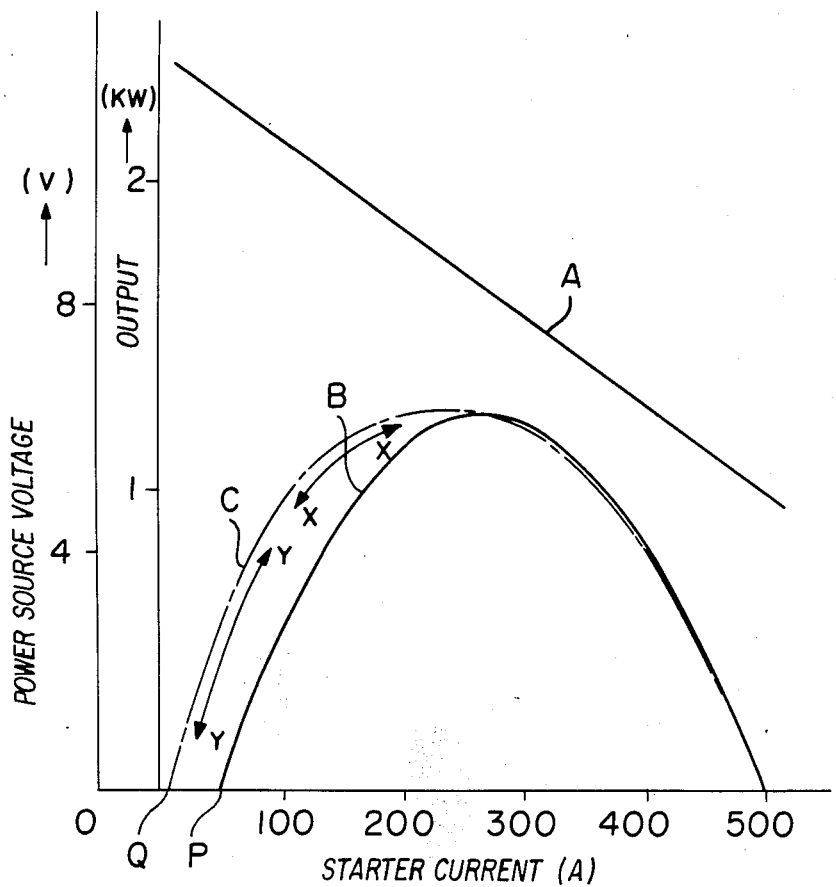
FIG. 1 is a graph illustrating an embodiment of the auxiliary device driving starter motor according to the present invention.

FIG. 1 is a graph for explaining an auxiliary device driving starter motor according to the present invention wherein the abscissa represents starter current (current flowing in a d.c. motor) and the ordinate represents power source voltage (which substantially corresponds to the terminal voltage of a battery) and output (output of the d.c. motor) respectively.

In FIG. 1, a solid line A indicates terminal voltage characteristic of a starter showing the characteristic of voltage drop due to an internal resistance of a battery (not shown) and a solid line B indicates output characteristic of a conventional d.c. motor (of a direct current, series winding type), which is preferable to start an engine. A point P in the solid line B indicates a value of current at the time of non-load revolution, i.e. non-load current of about 50 amperes. A one-dotted chain line C indicates output characteristic obtained by improving the characteristic shown by the solid line B of the d.c. motor in which the non-load current is reduced from the point P to a point Q (about 5 amperes).

In accordance with the present invention, the non-load current is substantially reduced by using any one or a combination of three measures as described below.

(1) A spring pressure applied to brushes which are in contact with a commutator of a d.c. motor is changed.

(2) A material used for the brushes, namely, an electric brush material of graphite which has been normally used is changed to the other brush material.

(3) A winding (armature winding, or field winding) is modified.

More detailed description will be made as to reduction in the non-load current, giving an example of a standard 0.8 KW starter.

When spring pressure to the brushes is lowered from about 2 kg as used in the conventional starter (i.e. about 2.85 kg/cm$^2$ for the area of contacting surface of the brush is 0.7 cm$^2$) to 0.7 kg (i.e. 1 kg/cm$^2$), the non-load current is reduced to 50%. The spring pressure of 0.6 kg or less does not provide the desired effect. Accordingly, it is preferable to use spring pressure in the range of from 0.7 kg to 0.9 kg (from 1.0 kg/cm$^2$ to 1.3 kg/cm$^2$)

In the conventional starter, a brush made of graphite in which 3 wt. % of molybdenum disulfide is incorporated has been used. It has been found that a brush of graphite incorporated with 6 wt. % of molybdenum disulfide reduces coefficient of friction to thereby reduce the non-load current to about 50%. A preferable range of incorporation of molybdenum sulfide into graphite is about 6 wt. % to about 8 wt. %.

The field winding having an increased number of turns while maintaining resistance at the same value, reduces non-load current. Specifically, when number of turns of the field winding for a single magnetic pole was increased from 8 to 10, reduction in non-load current of about 20% was accomplished.

In the combiantion of the first and second measures, the non-load current was reduced from about 40 amperes to about 10 amperes.

Further, the combination of the three measures reduced the non-load current to about 8 amperes.

Figure 2:
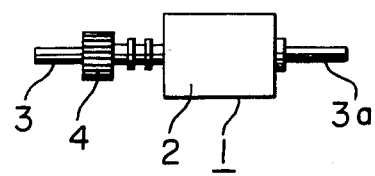
FIG. 2 is a diagram showing a schematic construction of the auxiliary device driving starter motor of the present invention.

FIG. 2 shows a schematic construction of an embodiment of the auxiliary device driving starter motor obtained by using the above-mentioned and measures.

In FIG. 2, a d.c. motor 2 having output characteristic as shown by the one-dotted chain line in FIG. 1 is generally constituted by a rotary output shaft 3 and a pinion 4 having a spline-engagement with the rotary output shaft 3 at its front part in a slidable manner. An auxiliary device of a rotating machine such as a pump (not shown) is connected to a shaft portion 3a projecting backwardly from the rotary output shaft 3, to be driven.

The operation of the embodiment having the construction as shown in FIG. 2 will be described.

Firstly, description will be made as to use of the d.c. motor as a starter motor used for the primary object and usage. When a key switch (not shown) is operated to close a circuit, the pinion 4 is shifted forwardly to interlock with a ring gear (not shown) of an engine as well known. At the same time, the d.c. motor 2 is connected to a battery to generate an output having the characteristic shown by the one-dotted chain line C in FIG. 1 whereby actuation of the engine is started according to the characteristic of the one-dotted chain line at a high output region as shown by X—X.

When the d.c. motor is used for driving an auxiliary rotating device (not shown) such as a pump, the d.c. motor 2 is actuated by current conduction, without advancing movement of the pinion 4, to drive the pump connected to the rear shaft portion 3a according to the characteristic of the one-dotted chain line at a low power region (a partial load) as shown by Y—Y.

Accordingly, in the auxiliary device driving starter motor according to the present invention, it goes without saying that it performs the starting of an engine, which is a primary role, with a high output power. Further, the starter motor drives an auxiliary rotating machine which should be operated for a relatively long time, wherein current at non-load revolution can be small, on account of which efficiency of the device can be improved. In addition, generation of heat, wearing and fault can be reduced.

In the embodiment described above, a d.c. motor of a series winding type (having a field coil) is used. However, it is possible to use a d.c. motor having a combination of a field device (a stator) and a permanent magnet.

As described above, the auxiliary device driving starter motor according to the present invention is constructed in such a manner that current at non-load revolution is reduced to a substantial extent by changing at least one of spring pressure to brushes and material for the brushes made in contact with a commutator of a d.c. motor, and an armature winding or a field winding, and an engine is started within a high output region and an auxiliary rotating machine is driven within a low power region of the output characteristic of the d.c. motor. Accordingly, power loss at non-load revolution can be reduced without making a device large-sized and efficiency of a device is improved, hence, a device having durability and reliability can be obtained.

We claim:

1. An auxiliary device driving starter motor comprising a d.c. motor for starting an engine, said d.c. motor having brushes and being adapted to start said engine by connecting its rotational force to said engine and to drive an auxiliary rotating machine without connecting the rotational force to said engine, wherein a spring pressure applied to said brushes is in a range from about 1.0 kg/cm$^2$ to about 1.3 kg/cm$^2$ to obtain an output characteristic in which current at non-load revolution is reduced and said engine is started within a high output region of said output characteristic while said auxiliary rotating machine is driven within a low power region.

2. An auxiliary device driving starter motor comprising a d.c. motor for starting an engine, said d.c. motor having brushes and being adapted to start said engine by connecting its rotational force to said engine and to drive an auxiliary rotating machine without connecting the rotational force to said engine, wherein said brushes are made of graphite in which molybdenum disulfide of about 6 wt. % to about 8 wt. % is incorporated to obtain an output characteristic in which current at non-load revolution is reduced and said engine is started within a high output region of said output characteristic while said auxiliary rotating machine is driven within a low power region.

3. An auxiliary device driving starter motor comprising a d.c. motor for starting an engine, said d.c. motor having brushes and being adapted to start said engine by connecting its rotational force to said engine and to drive an auxiliary rotating machine without connecting the rotational force to said engine, wherein a spring pressure applied to said brushes is in a range from about 1.0 kg/cm$^2$ to about 1.3 kg/cm$^2$ and said brushes are made of graphite in which molybdenum disulfide of about 6 wt. % to about 8 wt. % is incorporated to obtain an output characteristic in which current at non-load revolution is reduced and said engine is started within a high output region of said output characteristic while said auxiliary rotating machine is driven within a low power region.

4. An auxiliary device driving starter motor comprising a d.c. motor for starting an engine, said d.c. motor having at least one of an armature winding and a field winding and being adapted to start said engine by connecting its rotational force to said engine and to drive an auxiliary rotating machine without connecting the rotational force to said engine, wherein one of said armature winding and said field winding is formed of a wire having a larger diameter and has an increased number of turns to obtain an output characteristic in which current at non-load revolution is reduced and said engine is started within a high output region of said output characteristic while said auxiliary rotating machine is driven within a low power region.

5. An auxiliary device driving starter motor comprising a d.c. motor for starting an engine, said d.c. motor having a field winding being adapted to start said engine by connecting its rotational force to said engine and to drive an auxiliary rotating machine without connecting the rotational force to said engine, wherein said field winding has a coil of 10 turns for one magnetic pole to obtain an output characteristic in which current at non-load revolution is reduced and said engine is started within a high output region of said output characteristic while said auxiliary rotating machine is driven within a low power region.

* * * * *